United States Patent [19]
Forti et al.

[11] Patent Number: 5,364,136
[45] Date of Patent: Nov. 15, 1994

[54] FLANGES AND BODIES FOR MICROWAVE WAVEGUIDES COMPONENTS

[75] Inventors: Adriano Forti; Enrico Brambilla, both of Vimercate, Italy

[73] Assignee: Alcatel Italia S.p.A., Milan, Italy

[21] Appl. No.: 968,069

[22] Filed: Oct. 30, 1992

[30] Foreign Application Priority Data

Nov. 12, 1991 [IT] Italy .................. MI91A003009

[51] Int. Cl.$^5$ ........................................ F16L 55/045
[52] U.S. Cl. .................... 285/176; 285/363; 285/405; 285/903; 333/242; 138/37; 138/44; 138/122
[58] Field of Search ............... 285/903, 176, 363, 405, 285/414, 177; 333/242; 138/37, 38, 42, 43, 44, 155, 122; 137/808

[56] References Cited

U.S. PATENT DOCUMENTS

| | | | |
|---|---|---|---|
| 1,096,623 | 5/1914 | Girtanner | 138/39 X |
| 1,116,971 | 11/1914 | Barker | 138/39 X |
| 2,854,212 | 9/1958 | Lantermann | 285/176 X |
| 3,046,507 | 7/1962 | Jones, Jr. | 333/95 |
| 3,110,001 | 11/1963 | Unger | 333/242 |
| 3,169,562 | 2/1965 | Gogel | 285/177 X |
| 3,239,254 | 3/1966 | Campbell | 285/903 X |
| 3,573,681 | 4/1971 | Miller | 333/242 |
| 3,786,378 | 1/1974 | Liguori | 333/98 |
| 4,225,161 | 9/1980 | Smith | 285/177 X |
| 4,407,327 | 10/1983 | Hanson et al. | 138/42 X |
| 4,712,812 | 12/1987 | Weir, III | 285/177 |
| 5,118,139 | 6/1992 | Lott | 285/176 X |
| 5,131,693 | 7/1992 | Miller | 285/903 X |

FOREIGN PATENT DOCUMENTS

| | | | |
|---|---|---|---|
| 0473054 | 4/1951 | Canada | 285/414 |
| 0189963 | 8/1986 | European Pat. Off. | |
| 8709581 | 10/1987 | Germany | |
| 0068871 | 1/1914 | Switzerland | 285/414 |
| 0012639 | of 1893 | United Kingdom | 285/177 |
| 1393392 | 5/1975 | United Kingdom | |

OTHER PUBLICATIONS

"Electronic Communications Systems," 2nd Edition, George Kennedy, McGraw-Hill, Inc., 1977, pp. 373 to 374.

*Primary Examiner*—Randolph A. Reese
*Assistant Examiner*—Heather Chun
*Attorney, Agent, or Firm*—Spencer, Frank & Schneider

[57] ABSTRACT

Joint formers for coupling between duct components having different cross-sections include a core having holes for fixing members and an opening provided with a hollowed out recess. In the opening there is formed at least one series of stepped spot-faced edges forming a series of cavities, each cavity rotated with respect to the others.

25 Claims, 14 Drawing Sheets

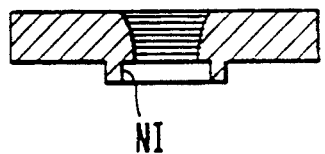
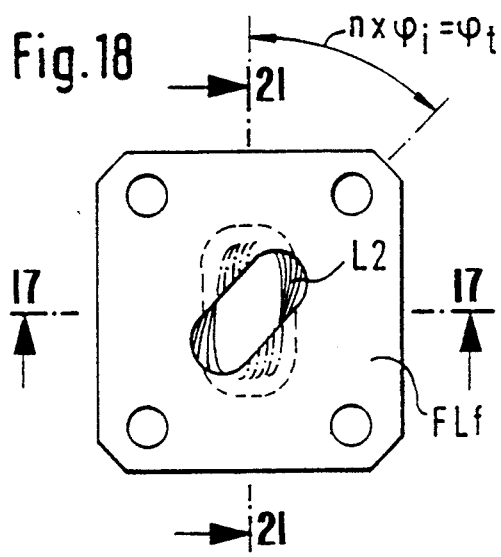
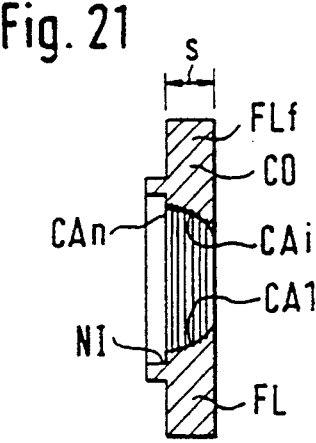
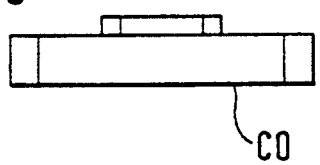
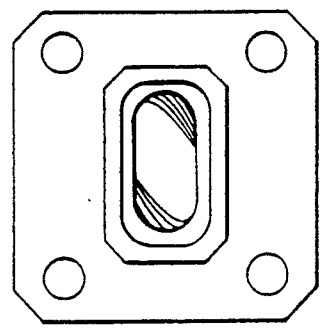
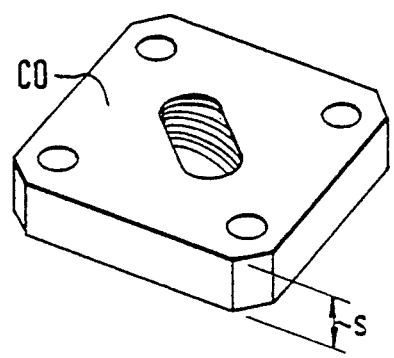

$n \times \varphi i = \varphi t$

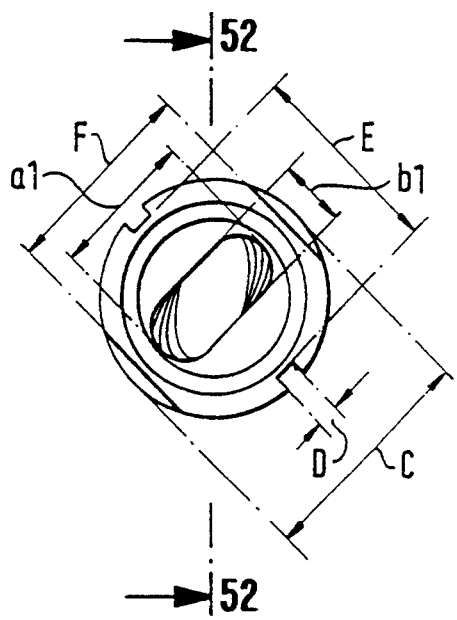
Fig. 51
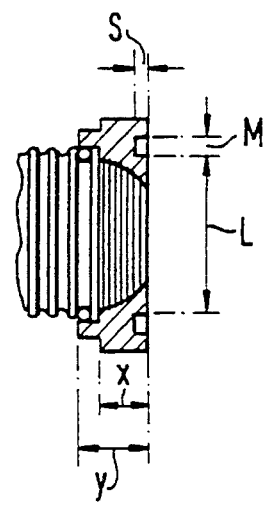
Fig. 52
Fig. 53
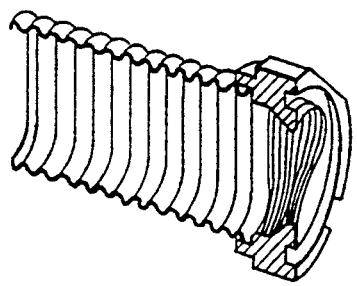

Fig. 57
Fig. 58
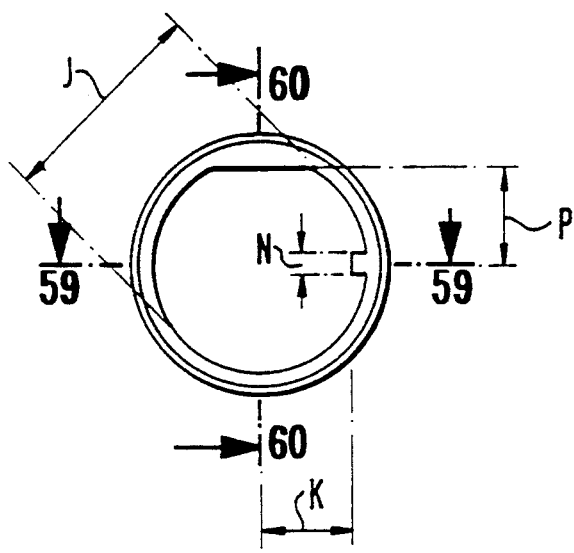
Fig. 60
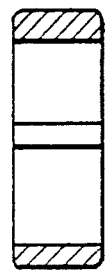
Fig. 59
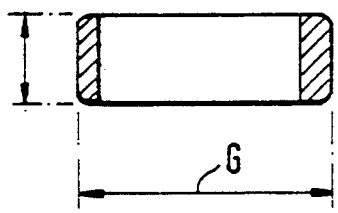
Fig. 61
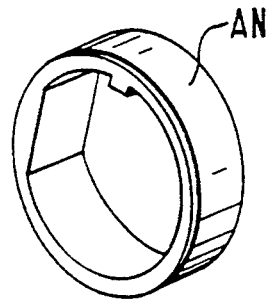

FLANGES AND BODIES FOR MICROWAVE WAVEGUIDES COMPONENTS

BACKGROUND OF THE INVENTION

1. Field of the Invention

The present invention relates to coupling elements such as microwave waveguide coupling elements, in particular to flanges and body heads, inserts and the like, for joint formers for coupling duct elements, at least one of which duct elements has a non circular section, including a core provided with holes for fastening members and an opening, generally located at the center, provided with a recess hollowed out in one own face of more immediate realization.

2. Background Information

With reference to the specific case of waveguides, it is known that most passive components, e.g., filters, circulators, couplers, isolators, terminations, etc., and active components, e.g., an oscillator with a cavity resonator at the output, or semiactive components, have outputs that have to enter waveguide sections. Normally when there is no problem as to space, coupling does not give rise to unsurmountable problems. However, in most of the actual appliances there is the need of connecting parts with misaligned waveguides, e.g., with polarization axes having relative angles of 90 degrees, without excluding rotations of different magnitudes.

Up to now, for couplings of this kind it was necessary to prepare intermediate elements between the two guides generally known as "twists."

These twists, besides being additional elements and therefore introducing hindrance, costs, and never yielding a perfect setup even if prepared with sophisticated means and workings must always be made on a case by case basis and do not lend themselves to being prepared for universal uses.

Such twists are extensively used in the field of telecommunications but no wireless set manufacturer finds it convenient to produce them in their own plant. Outside manufacturing of twists is however extremely onerous and adversely affects the cost of equipment.

SUMMARY OF THE INVENTION

It is an object of the present invention to provide headers with openings, e.g., flanges, inserts, body heads and the like for duct joints, which are free of the above-mentioned drawbacks and achieve a direct coupling with the required rotation, without increasing overall dimensions, costs and so on, and, above all, without considerable loss of head and disturbances on fluids conveyed without indispensable interpositions.

This and other objects are attained with components according to the present invention having as a cavity a series of communicating spot-facings with suitable depth and rotation. Preferably this spot-facing is realized with successive stepped cavities rotated each with respect to the other, at parity of configuration, and which will assume shape (e.g. rectangular, circular, elliptical) and dimensions according to components, materials and operating frequencies.

BRIEF DESCRIPTION OF THE DRAWINGS

The various aspects and advantages of the invention will become more apparent from the following description of the preferred embodiments thereof illustrated in the attached drawings wherein:

FIGS. 7, 19, 25, 31, 37, 43 are side views of a flange body;

FIGS. 5, 9, 17, 21, 23, 27, 29, 33, 35, 39, 41, 45, 52, 55 and 62 are sectional views of said bodies provided with cavities according to the invention;

FIGS. 10, 22, 28 are perspective views of flange bodies;

FIGS. 34, 40, 46, 47, 48, 49, 53, 56 and 64 are prespective sectional views; FIG. 61 is a perspective view of the conventional guide ring according to spec. IEC—PCR 220-500 indicated by AN in the assembly of FIG. 50 and as a detail in FIGS. 57 to 61.

DETAILED DESCRIPTION OF THE PREFERRED EMBODIMENTS

In the figures, FL1 stands for a first flange with four holes F01, F02, F03, F04, having the central opening AC for the coupling with the head T of a section (e.g. a waveguide section): similarly for flange FL2 references.

Figure 9:
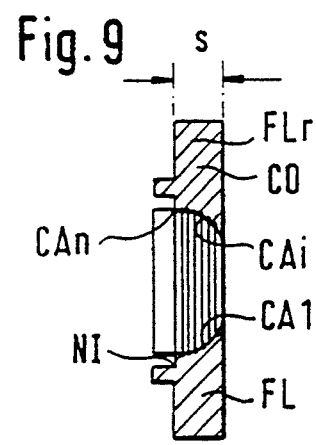
Figure 7:
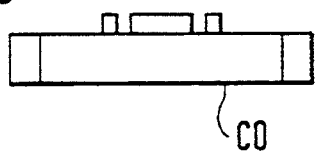
Figure 8:
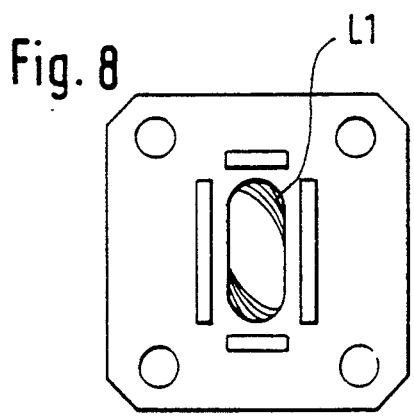
Figure 10:
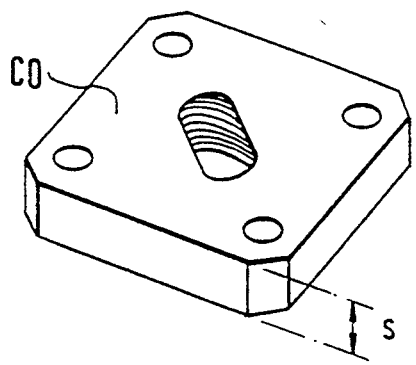

According to the most remarkable aspect of the invention the body CO of each flange (e.g. FIGS. 7, 9, 10) is internally worked, e.g. milled in its entire thickness S (FIG. 9) thus obtaining through successive spot-facings, a series of communicating cavities CA1, . . . CAi, . . . CAn, which however are rotated, each by an angle $\psi i$ that can be constant or even variable. If there are n cavities, the sum of n successive angles of rotation will give the total rotation $\psi t$ that the flange spot-faced according to the invention will be able to give to the component coupled thereto.

Figure 1:
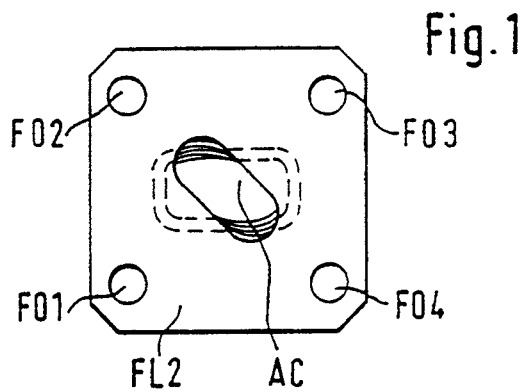
FIGS. 1 and 3, as well as FIGS. 6, 8, 18, 20, 24, 26, 30, 32, 36, 38, 42, 44, 51, 54, 58 and 63 are front views (schematic and partial) of flanges according to the invention.
Figure 2:
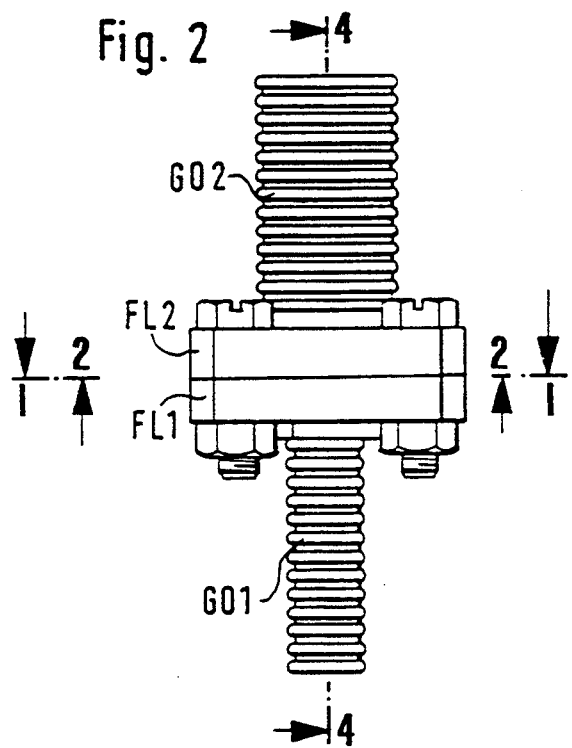
FIG. 2 is a top plan view of coupled flanges, FIG. 4 being partially sectioned.
Figure 4:
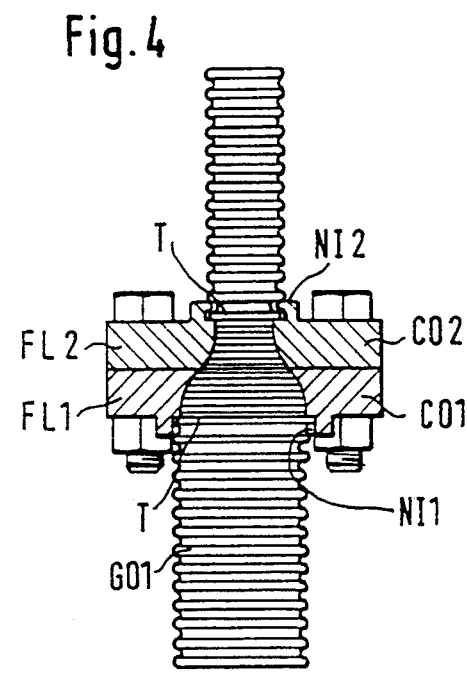
Figure 3:
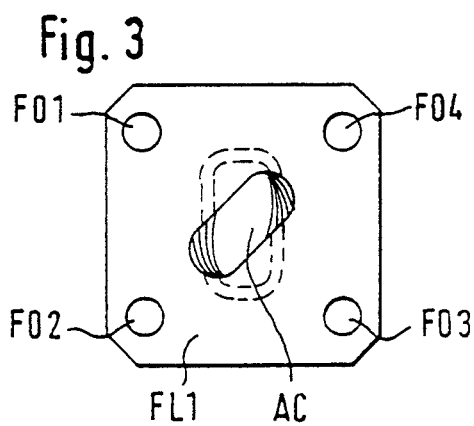
Figure 5:
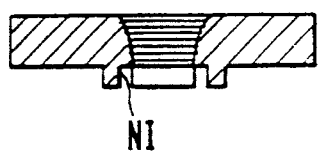
Figure 6:
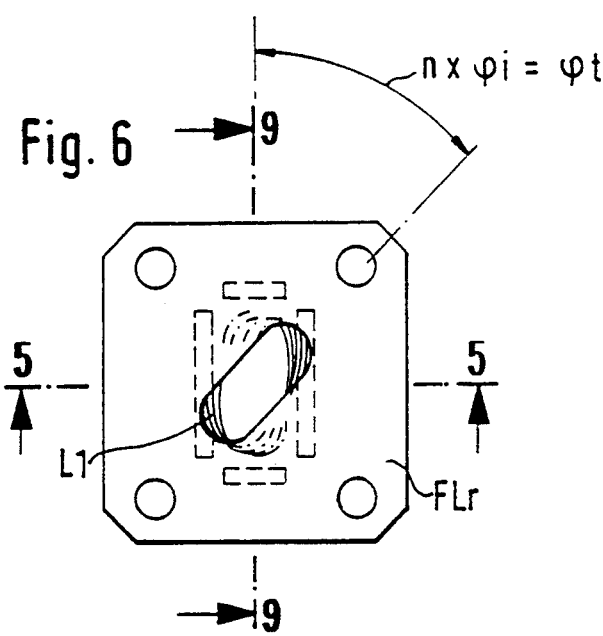

Just to clear up at once with a very easy and appropriate example, in FIGS. 2 and 4 there are illustrated two flanges (FL1 coupled through recess NI1 to waveguide G01 and FL2 coupled through recess NI2 to waveguide GO2) each with the same number of cavities CAn, all contained in each thickness S of respective flange, each cavity CAi (see FIG. 9) being rotated of the same angle $\psi i$. For instance, considering a standard flange having thickness $S \geqq 5$ mm., with a cavity depth 0.5 mm., it will be enough to spot-face nine cavities CA1 to CA9 each 0.5 mm. deep and rotated 5 degrees with respect to the following and preceding one. If, at parity of all other conditions, all nine rotations on FL1 are counterclockwise, rotations on FL2 must be clockwise.

Rotation of each so spot-faced flange is 22.50 degrees per face, wherein the cumulative rotation that the two faces will give to flange body is 45 degrees.

One of many advantages of the invention lies in that with flanges, inserts and/or spot-faced bodies, coupling between elements of heterogeneous materials is now possible, and moreover, manufacture is made with immense cost savings since generally it is carried out on the same machine which performs other work. For instance, when the cavities of a multicavity filter body are obtained in a single workpiece, without removing the workpiece, the spot-face operation follows afterward, which may be executed before or after the excavation of cavities, using the tools for positioning the workpiece on the working machine with cost savings.

In order to better illustrate the versatiliby of the invention, in FIGS. 11 to 16 there are represented six types of connection (only a small number of the possibilities offered by the proposed system) which can be conveniently applied both in hybrid cases (flexible and-/or rigid guides with flanges according to IEC in all ranges) and in special cases comprising spot-faced and soldered inserts and/or spacers with very low overall dimensions.

In the following, some of the most significant appliances directed to the special case of waveguides, will be described. It is to be understood that the invention is not limited to these electronic appliances but applicable to any type of node for ducts, in particular for fluids.

DESCRIPTION OF MAIN APPLIANCES REPRESENTED IN FIGS. 11 TO 16

1) Mixed Joint in Rigid and Flexible Waveguides

Figure 11:
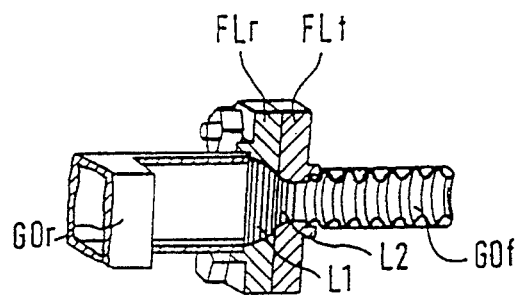
FIGS. 11 to 16 are perspective sectional views, some partially sectioned, of six emblematic types of connection.

FIG. 11 represents a coupling between a rigid waveguide GOr, welded to respective flange FLr (FIGS. 5 to 10) and a flexible waveguide GOf welded to flange FLf (FIGS. 17 to 22). The two flanged crop-ends, spot-faced according to the invention, are then joined by aligning the openings and fastened, most frequently through standard bolts and nuts (e.g., SEC. 154 IEC—UBR 84-320) without excluding other types of coupling that are also possible.

Spot-facing L1 of the rigid guide flange FLr extends at an angle $\psi$ (FIG. 6) and spot-facing L2 on flexible guide flange FLf extends also at a total angle $\psi t$ (FIG. 18).

These spot-facings L1 and L2, for obvious working reasons, have the same steps (FIGS. 9 and 21) besides the same rotations.

2) Flexible Waveguide Homogeneous Joint

Figure 12:
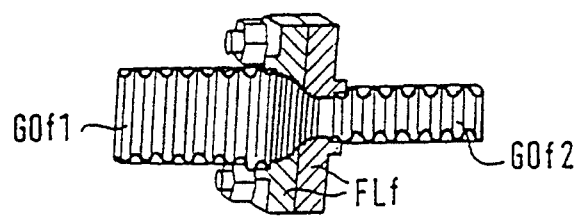

FIG. 12 represents the joining of two waveguides GOf1 and GOf2 (FIGS. 1 to 4) both of which are flexible, welded to respective flanges FLf (FIGS. 17 to 22), constituting two flanged crop-ends (with guides rotated 90 degrees with respect to each other) they also being joined through bolts and nuts as already described in 1 above.

3) Multicavity Filter Assembly, With Flexible Waveguide Joint

Figure 13:
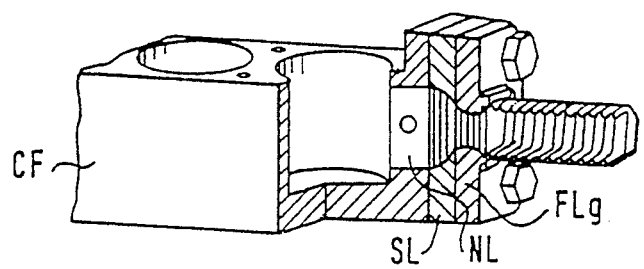

FIG. 13 illustrates the assembling of the body of a multicavity filter CF having its opening NL realized with a not spot-faced rectangular waveguide, joined to a flange crop-end composed of a flexible waveguide GOf and a spot-faced welded flange FLf (FIGS. 17 to 22) which, with the fitting in of a spot-faced insert SL (FIGS. 23 to 28) between body and crop-end, completes this assembly that is characterized by the following requirements:

3.1 Use of components available on the market which, joined with elements that loose rotation between the guides, allow the product to attain the described requirement without immense cost increases.

3.2 Possibility of giving angle rotations between two guides (without limitations in magnitude), by acting only on the spot-faced insert SL, which will assume the value $\psi t$ as a function of required rotation angle $\psi i$ and number of cavities n.

3.3 Possibility to prepare assemblies compatible with specifications for microwave joints according to 154 IEC+UBR 84-320 without limiting others, when required by already available components or required by different standards.

Figure 14:
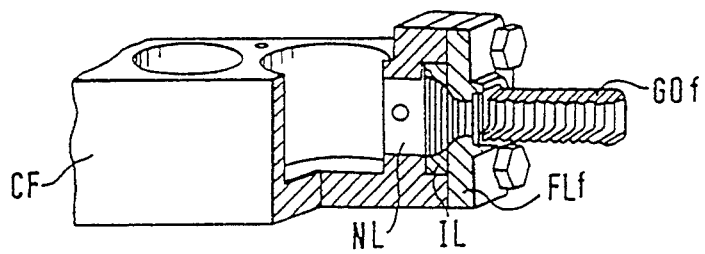

4) Multicavity Filter Assembly With Spot-faced Welded Insert and Flexible Waveguide Joint FIG. 14 corresponds to the assembling of a multicavity filter body, provided with opening obtained with spot-faced insert IL (FIGS. 29 to 33) welded in the body itself (FIG. 14) to a crop-end of flexible waveguide GOf with flange FLf (FIGS. 17 to 22).

Main Requirements of the Appliance 4.1 Producibility of microwave components having bodies of heterogeneous materials.

4.2 Possibility of providing the above-mentioned bodies with spot-faced guide openings, thus saving additional thicknesses (however without excluding their use).

4.3 Wide possibility of coupling of standard guide component parts with others provided with a spot-faced joint.

Figure 15:
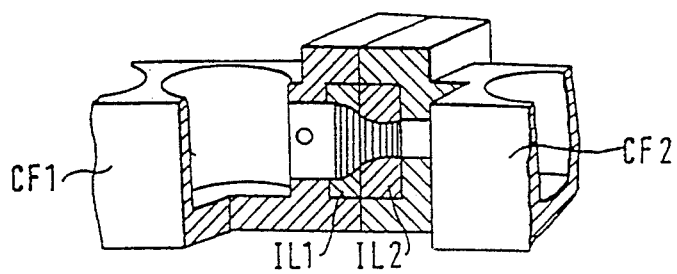

5) Homogeneous Assembly Composed of Two Multicavity Filters Having Bodies with Welded Spot-faced Guide Openings FIG. 15 illustrates the joining of two filter bodies CF1 and CF2 with welded spot-faced inserts IL1 and IL2, assemblable through drilling and bolts and nuts according to 154 IEC—BR 84-320, without limiting fastenings according to other specifications.

Main Requirement of the Appliance 5.1 All features described above at 4.1, 4.2, 4.3, and, at the same time, more advantages and cost savings in toolings which are cheaper, it being possible to save expensive surfacings of the workpiece.

5.2 Minimization of overall dimensions of components.

5.3 Use of heterogeneous materials for industrial purposes in various solutions on a case by case basis.

Figure 16:
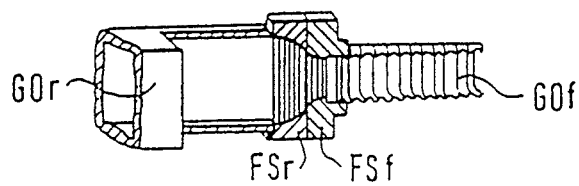
Figure 23:
Figure 24:
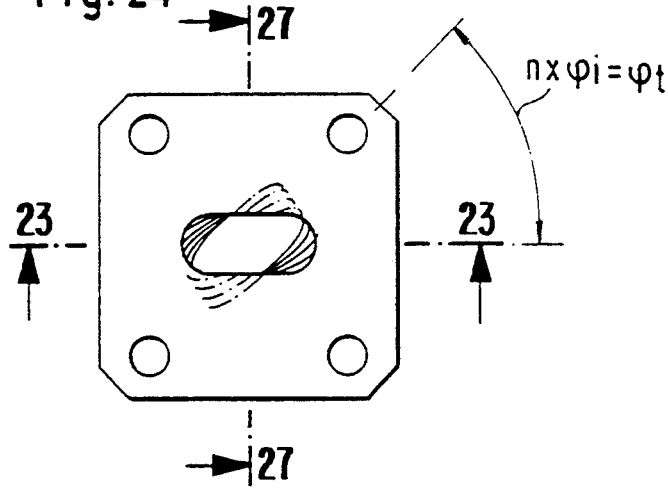
Figure 27:
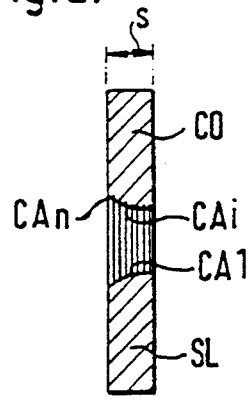
Figure 25:
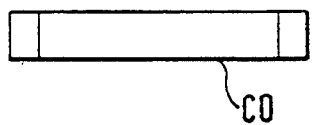
Figure 28:
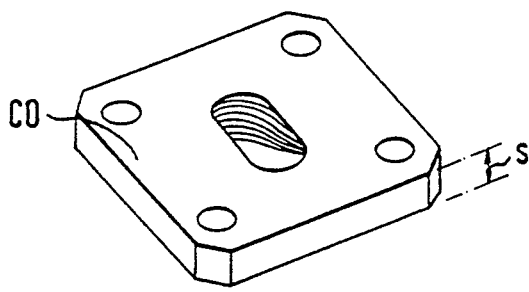
Figure 26:
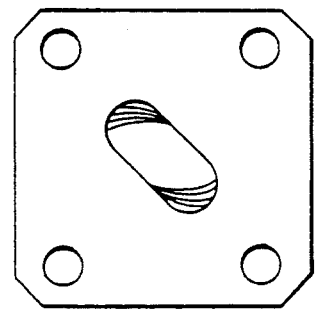
Figure 29:
Figure 30:
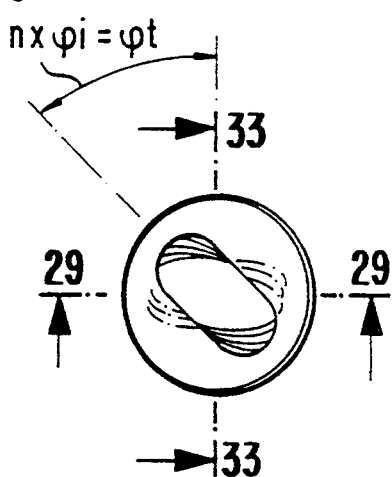
Figure 33:
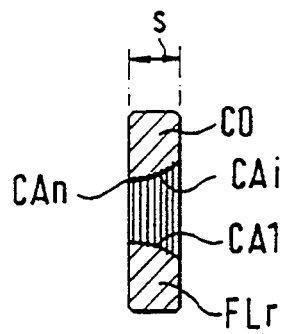
Figure 31:
Figure 34:
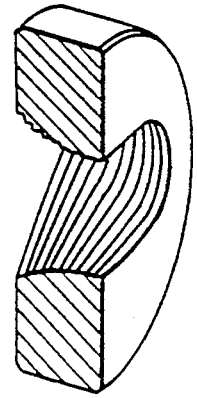
Figure 32:
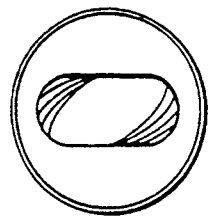
Figure 35:
Figure 36:
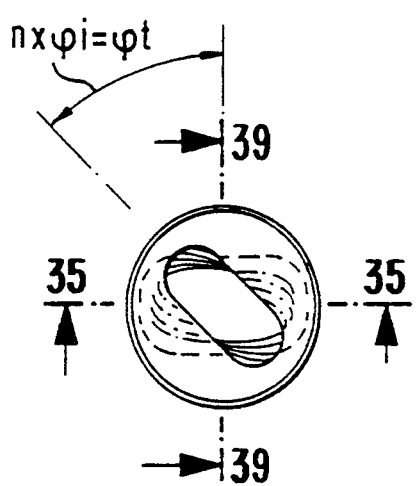
Figure 37:
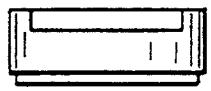
Figure 38:
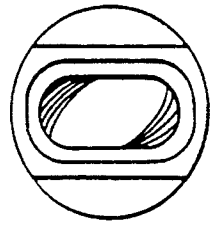
Figure 39:
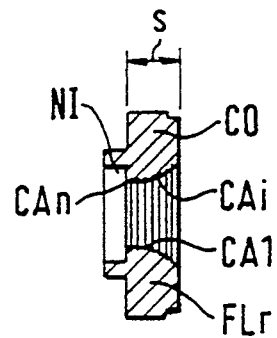
Figure 40:
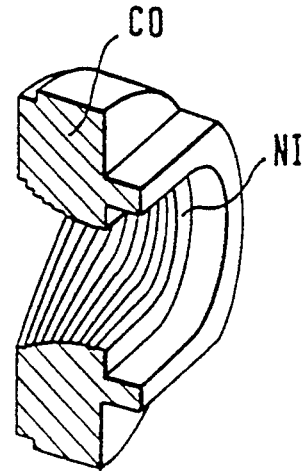
Figure 41:
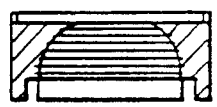
Figure 42:
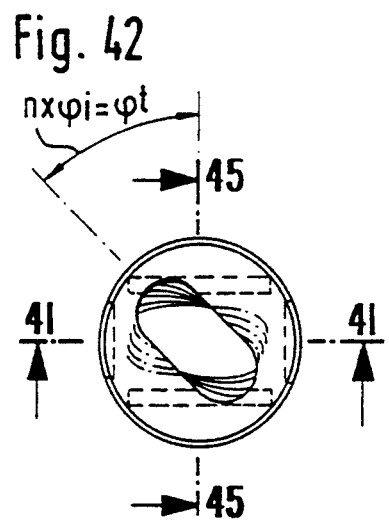
Figure 45:
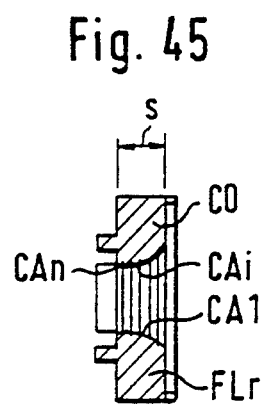
Figure 43:
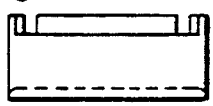
Figure 44:
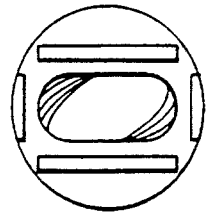
Figure 46:
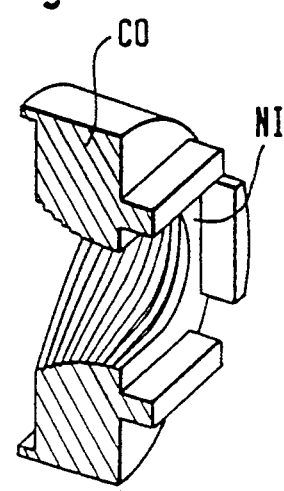
Figure 47:
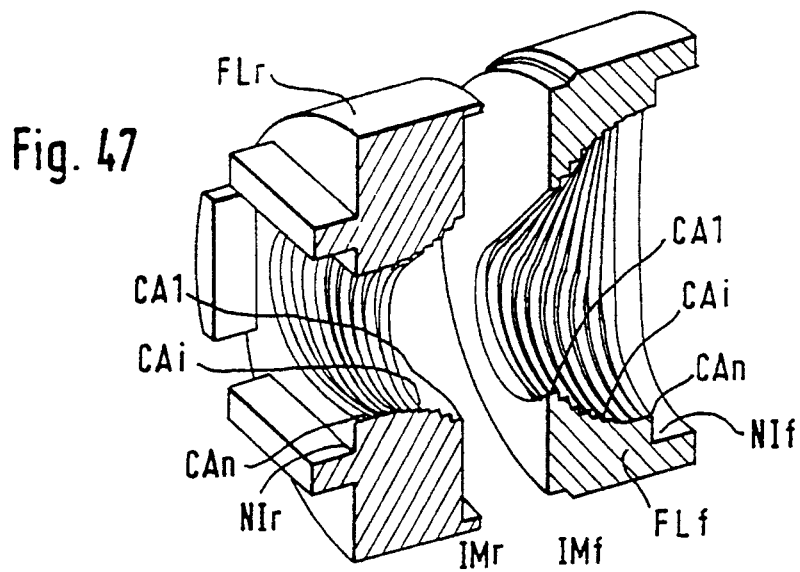
Figure 48:
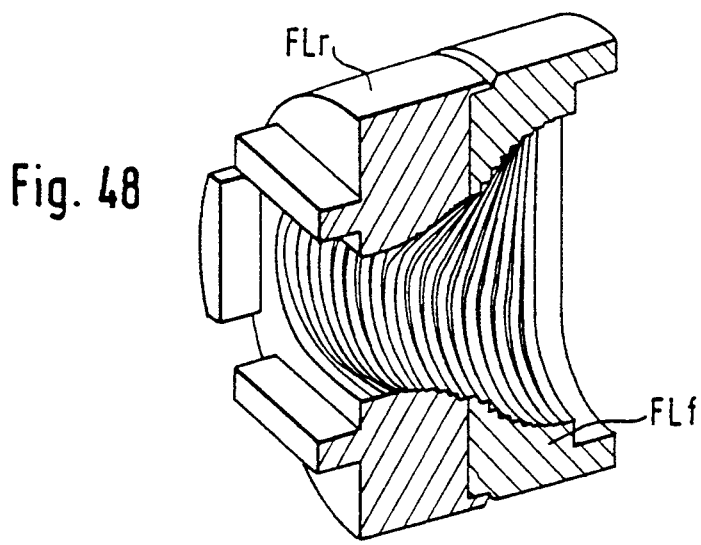
Figure 49:
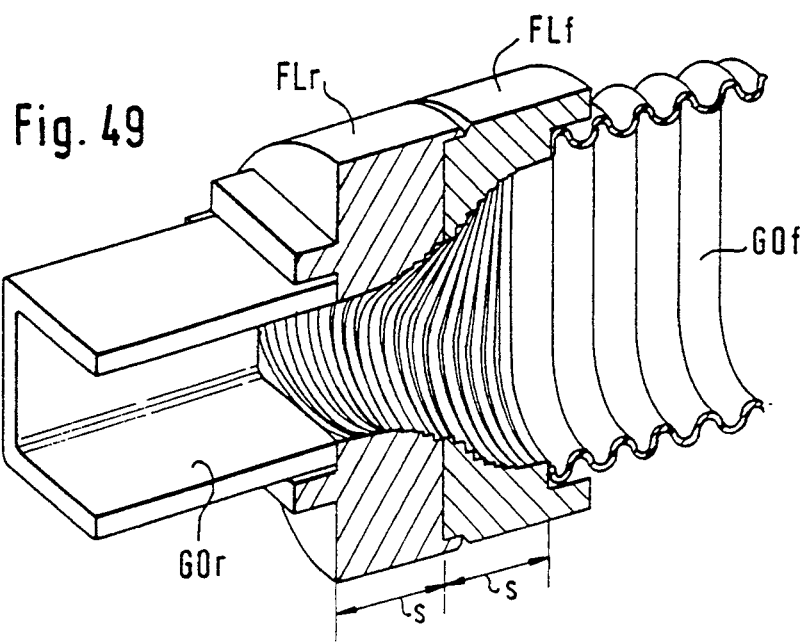

6) Rigid-flexible Waveguide Mixed Joint With Permanent Assembling Through Welding FIG. 16 represent the joining of two waveguide cropends, one of rigid guide GOr and the other of flexible guide GOf, both joined to respective flange FSr, FSf, through soldering, after having joined part IMf to part IMr, FIGS. 47 to 49.

The above-mentioned figures represent axonometric sections of the joint and in particular FIG. 47 illustrates the shape and arrangement of cavities (CA1, . . . CAi, . . . , CAn) spot-faced in the flanges, the openings IMr and IMf, the assembling of the same and the recesses NIr and NIf for waveguide solderings.

FIG. 48 is a view of the flanges FLr and FLf, which represents them joined in order to show the geometric-positional continuity of the cavities.

FIG. 49 represents the entire assembling of the soldered joint completed with all the components elements.

Main Requirement of the Solution 6.1 Possibility of designing components composed with mixed technique materials (rigid+flexible guide).

6.2 Possibility of preparing flanges suitable for composing joints with angular rotations of any magnitude between the guides.

6.3 Maximum limitation of coupling overall dimensions and possibility of adapting the solution to the needs of use, e.g., various types of waveguides and operation ranges.

7) Flexible Waveguide Homogeneous Joint Flanged According 154 IEC−PCR 220-500

Another remarkable use of the invention is the possibility of preparing spot-faced joints which can be utilized in the field of R220 . . . R500 waveguide families by using flangings contemplated by the above-mentioned specification.

Figure 50:
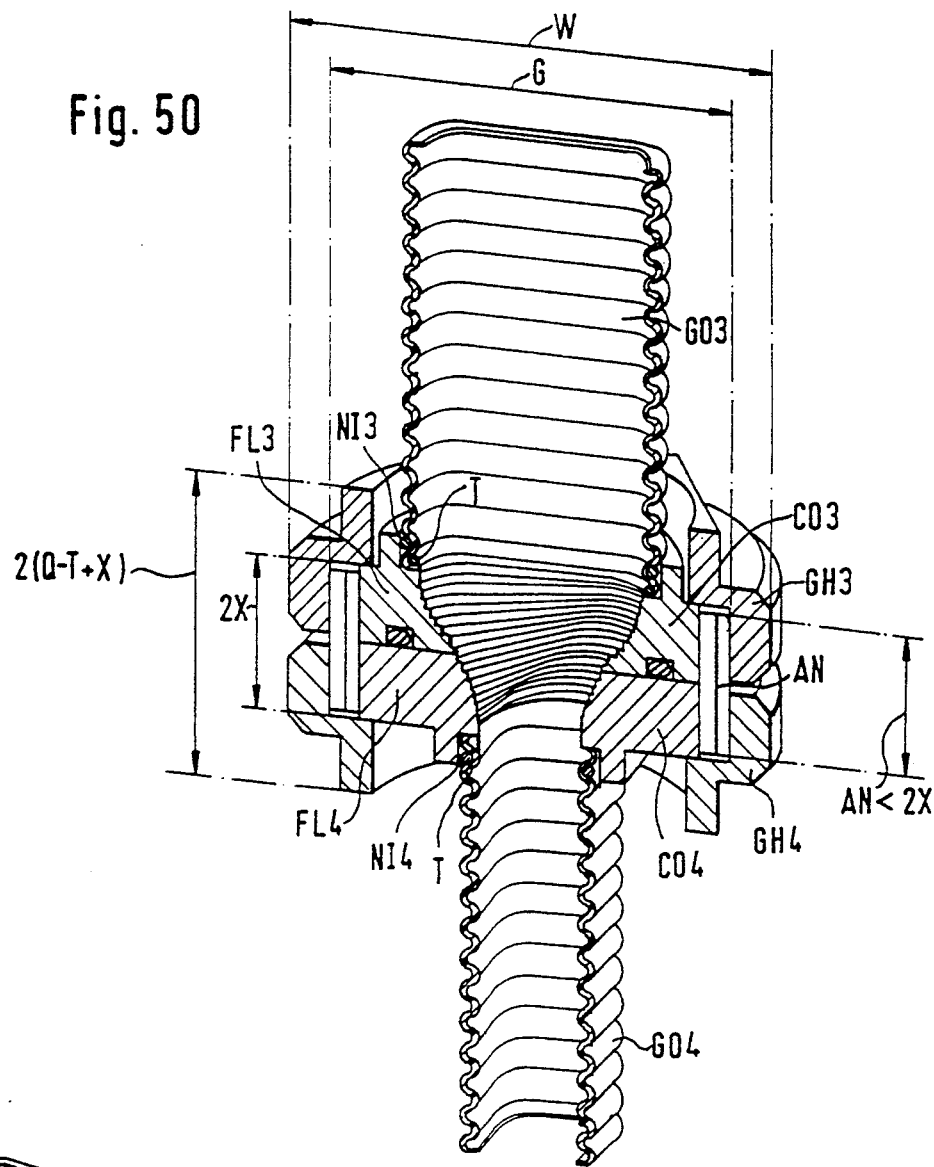
FIG. 50A is an assembly: the axonometry of a flexible waveguide joint, FIG. 50 being the respective axonometric sectional view.
Figure 50A:
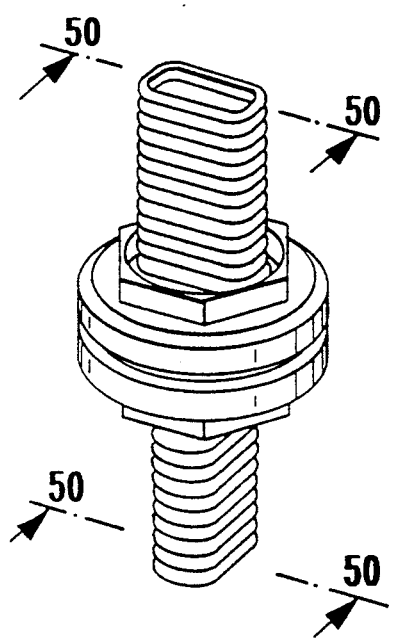
Figure 54:
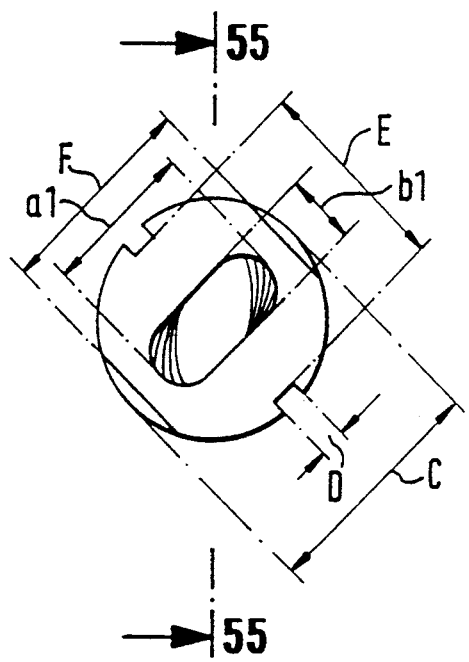
Figure 55:
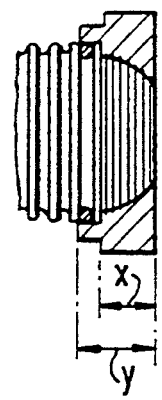
Figure 56:
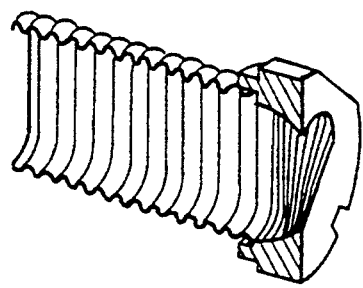
Figure 62:
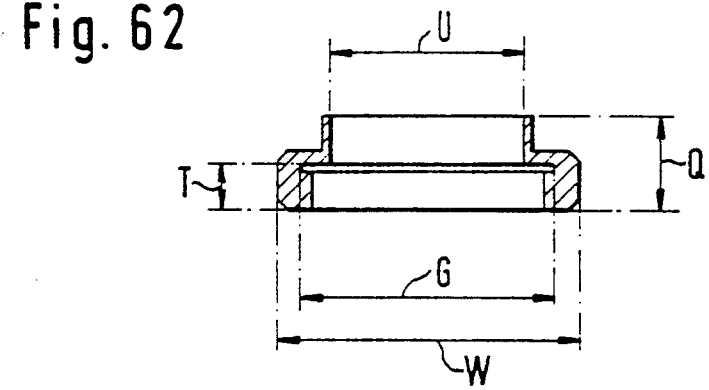
Figure 63:
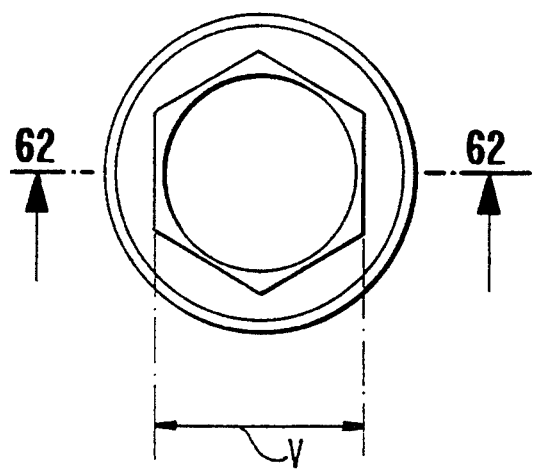
Figure 64:
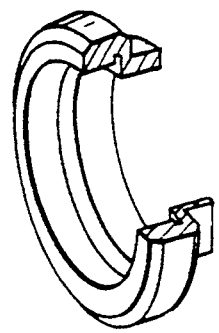

This type of flanging, as results evident from FIGS. 50 and 50A, shows as an example, a fast connection joint, in a spot-faced solution, where the requirements of IEC specification are met with the addition of possibilities offered by twisting.

In particular, as can be seen in FIG. 50, there is illustrated therein a joint composed of two joined flanges FL3 and FL4, these flanges having respective bodies designated by CO3 and CO4, each of the bodies being provided with a groove DxE (FIGS. 51-54) on which there is slided a guide ring AN which will assure alignment of the waveguides and along with ring nuts GH3 and GH4 will contribute to fast tightening of the joint.

Main Requirements of the Appliance 7.1 Possibility of using joints of standard dimension, present in instruments and equipments available on the market.

7.2 Miniaturization to a maximum extent of component elements and fast coupling and decoupling, taking advantage of the fact that this joint is without screws.

7.3 Adaptability of the spot-faced solution to all variations of use contemplated by IEC specifications for this type of joint.

7.4 Possibility of making up joints with non homogeneous partly-finished products, i.e., rigid and flexible guides of various shape, e.g. rectangular, circular, elliptic and of different material, by adapting the drawing specifications to be more suitable for the desired use.

7.5 RF shielding of the joint by using conductive rings ANc to be inserted between the flanges, and choosing dimensions and materials which are the more suitable at the frequencies used.

We claim:

1. Joint formers for coupling duct components having different cross-sections, said joint formers each comprising:
   a core having holes for receiving fixing members therethrough for holding said joint formers in a fixed relationship with said duct components, and an opening provided with a hollowed out recess, said opening having at least one series of stepped spot-faced edges forming a series of cavities, each of said cavities rotated with respect to the others.

2. Joint formers according to claim 1, wherein said core comprises a first flange element coupled with an other element, the other element being one of a second flange element and an intermediate insert element, and wherein a series of cavities of the first element are of such a number and with such successive rotations as to create a first half of an overall desired rotation between the duct components, the other half of said desired rotation being created by a series of cavities of the other element, the core opening being thereby defined by the cavities of the first element and the other element.

3. Joining members for fluid duct components, said joining members comprising a plurality of spot-faced cavities rotated with respect to each other, wherein said members do not produce appreciable losses and disturbances on transmission of conveyed fluids therethrough.

4. Twist inserts for use between flanges and body heads, said twist inserts having more than one series of stepped cavities, rotated with respect to each other, whereby at least two successive series of such cavities realize a total desired rotation between two elements of a duct.

5. Twist inserts according to claim 4 wherein said series of stepped cavities are substantially equal in size, and are rotated by a substantially constant rotation amount between cavities, said cavities being of a number such as to create the total desired rotation between the elements of the duct.

6. A duct connector for connecting at least first and second ducts where the first and second ducts are of a different construction, said connector comprising:
   a first member for connection to a first duct, the first member being provided with a centrally disposed opening therethrough, the opening being formed as a series of stepped cavities; and
   a second member for connection to a second duct at one end and to said first member at another end, the second member being provided with a centrally disposed opening therethrough, the opening being formed as a series of stepped cavities;
   wherein the first and second members are formed so that their respective series of stepped cavities form a continuous series of stepped cavities between the first and second ducts; and
   wherein the first duct has a first axis of polarization and the second duct has a second, different axis of polarization, and the series of stepped cavities each have a polarization axis rotated with respect to adjacent cavities by a fraction of a difference in the polarization axes of the first and second ducts, whereby a total desired polarization axis rotation is performed by the connector between the first and second ducts.

7. The connector according to claim 6, further comprising an insert member for connection between said first member and second member, said insert member being provided with a centrally disposed opening therethrough, the opening being formed as a series of stepped cavities, wherein the first member, second member, and insert member are formed so that their respective series of stepped cavities form a continuous opening as a series of stepped cavities between the first and second ducts.

8. The connector according to claim 6, wherein said first and second members are provided with connecting and positioning means for fixedly connecting the first and second members together in alignment.

9. The connector according to claim 8, wherein said connecting and positioning means comprises flanges disposed on each of said first and second members, holes through said flanges, threaded bolts extending through respective ones of said holes, and threaded nuts rotatably disposed on respective ones of said bolts.

10. The connector according to claim 8, wherein said connecting and positioning means comprises an annular lock ring, and a groove formed in said first and second members for receiving said annular lock ring.

11. The connector according to claim 10, wherein said annular lock ring is made of an electrically conducting material and thereby provides electrical shielding of the connector.

12. The connector according to claim 7, wherein the first duct is part of a cavity-filter body and the first member includes means for coupling to the cavity-filter body.

13. The connector according to claim 6, wherein the first duct is a rigid waveguide and the second duct is a flexible waveguide, the first member has means for coupling to the rigid waveguide and the second member has means for coupling to the flexible waveguide.

14. A duct connector for connecting at least first and second ducts where the first and second ducts are of a different construction, said connector comprising:
   a first member for connection to a first duct, the first member being provided with a centrally disposed opening therethrough, the opening being formed as a series of stepped cavities; and
   a second member for connection to a second duct at one end and to said first member at another end, the second member being provided with a centrally disposed opening therethrough, the opening being formed as a series of stepped cavities;
   wherein the first and second members are formed so that their respective series of stepped cavities form a continuous series of stepped cavities between the first and second ducts; and
   wherein the first duct has a circular cross-section and the second duct has a rectangular cross-section, the stepped cavities of the connector members forming a circular to rectangular taper section.

15. The connector according to claim 14, further comprising an insert member for connection between said first member and second member, said insert member being provided with a centrally disposed opening therethrough, the opening being formed as a series of stepped cavities, wherein the first member, second member, and insert member are formed so that their respective series of stepped cavities form a continuous opening as a series of stepped cavities between the first and second ducts.

16. The connector according to claim 14, wherein said first and second members are provided with connecting and positioning means for fixedly connecting the first and second members together in alignment.

17. The connector according to claim 16, wherein said connecting and positioning means comprises flanges disposed on each of said first and second members, holes through said flanges, threaded bolts extending through respective ones of said holes, and threaded nuts rotatably disposed on respective ones of said bolts.

18. The connector according to claim 16, wherein said connecting and positioning means comprises an annular lock ring, and a groove formed in said first and second members for receiving said annular lock ring.

19. The connector according to claim 18, wherein said annular lock ring is made of an electrically conducting material and thereby provides electrical shielding of the connector.

20. The connector according to claim 14, wherein the first duct is part of a cavity-filter body and the first member includes means for coupling to the cavity-filter body.

21. The connector according to claim 14, wherein the first duct is a rigid waveguide and the second duct is a flexible waveguide, the first member has means for coupling to the rigid waveguide and the second member has means for coupling to the flexible waveguide.

22. A duct connector for connecting at least first and second ducts where the first and second ducts are of a different construction, said connector comprising:
   a first member for connection to a first duct, the first member being provided with a centrally disposed opening therethrough, the opening being formed as a series of stepped cavities; and
   a second member for connection to a second duct at one end and to said first member at another end, the second member being provided with a centrally disposed opening therethrough, the opening being formed as a series of stepped cavities;
   wherein the first and second members are formed so that their respective series of stepped cavities form a continuous series of stepped cavities between the first and second ducts;
   wherein the first duct has dimensions different from the second duct, the stepped cavities of the connector members forming a taper section: and
   wherein the first duct has a first axis of polarization and the second duct has a second, different axis of polarization, and the series of stepped cavities each have a polarization axis rotated with respect to adjacent cavities by a fraction of a difference in the polarization axes of the first and second ducts, whereby a total desired polarization axis rotation is performed by the connector between the first and second ducts.

23. A duct connector for connecting at least first and second ducts where the first and second ducts are of a different construction, Said connector comprising:
   a first member for connection to a first duct, the first member being provided with a centrally disposed opening therethrough, the opening being formed as a series of stepped cavities; and
   a second member for connection to a second duct at one end and to said first member at another end, the second member being provided with a centrally disposed opening therethrough, the opening being formed as a series of stepped cavities;
   wherein the first and second members are formed so that their respective series of stepped cavities form a continuous series of stepped cavities between the first and second ducts;
   wherein said first and second members are provided with connecting and positioning means for fixedly connecting the first and second members together in alignment; and
   wherein said connecting and positioning means comprises an annular lock ring, and a groove formed in said first and second members for receiving said annular lock ring.

24. The connector according to claim 23, wherein said annular lock ring is made of an electrically conducting material and thereby provides electrical shielding of the connector.

25. A duct connector for connecting at least first and second ducts where the first and second ducts are of a different construction, said connector comprising:
   a first member for connection to a first duct, the first member being provided with a centrally disposed opening therethrough, the opening being formed as a series of stepped cavities; and a second member for connection to a second duct at one end and to said first member at another end, the second member being provided with a centrally disposed opening therethrough, the opening being formed as a series of stepped cavities;

wherein the first and second members are formed so that their respective series of stepped cavities form a continuous series of stepped cavities between the first and second ducts; and wherein the first duct is a rigid waveguide and the second duct is a flexible waveguide, the first member has means for coupling to the rigid waveguide and the second member has means for coupling to the flexible waveguide.

* * * * *